Patented Oct. 28, 1924.

1,513,122

UNITED STATES PATENT OFFICE.

YASUJURO NIKAIDO, OF BAY CITY, MICHIGAN, ASSIGNOR TO MICHIGAN CHEMICAL COMPANY, A CORPORATION OF MICHIGAN.

PROCESS OF VULCANIZING RUBBER.

No Drawing.   Application filed May 5, 1921. Serial No. 466,999.

*To all whom it may concern:*

Be it known that I, YASUJURO NIKAIDO, a citizen of Japan, and a resident of Bay City, in the county of Bay and State of Michigan, U. S. A., have made a new and useful Invention in Processes of Vulcanizing Rubber, of which the following is a specification.

The invention relates to the vulcanization of rubber or caoutchouc. It has for its principal objects the provision of a process whereby the rapidity of vulcanization can be increased, whereby the time or temperature of vulcanization can be lessened, which can be practiced at a minimum of expense with a relatively small quantity of the accelerating agent, and the provision of a product which is of superior quality and durability.

In its broadest form the invention contemplates the use of those of the alkylated dithiocarbamates of the metals which are suitable for the purpose. These include among others the compounds into which the methyl group or groups are introduced and which may be designated as the methylated dithiocarbamates of the metals, those compounds into which the ethyl group or groups are introduced and which may be designated as the ethylated dithiocarbamates of the metals, and those compounds into which other of the alcohol radicals are introduced, such as the propyls, the butyls, etc.

The compounds which are preferably used are the monomethyl dithiocarbamates of the metals and the dimethyl dithiocarbamates of the metals, and such compounds may be used together, as hereinafter set forth in a specific example, or may be used separately. The homologues of the monomethyls such as the monoethyl or monopropyl may also be employed in some cases, such monomethyls and their homologues being designated as the monoalkyls. Similarly as to the dimethyls and their homologues which may be designated as the dialkyls.

The accelerating compounds, preferably employed, consisting of the different metallic salts of monomethyl dithiocarbamic acid and dimethyl dithiocarbamic acid, or a mixture of them, are produced by precipitating the acids from a solution of the acids or their amino-ammonium salts, or their esters or their alkali salts, with a soluble salt of the metal desired. For example, a ten percent solution of zinc sulphate is gradually added to a solution containing approximately five percent of a mixture of amino-ammonium salts of monomethyl dithiocarbamic acid and dimethyl dithiocarbamic acid stirring continually until no more precipitate is formed. The precipitate thus formed is a mixture of two zinc salts, namely, monomethyl dithiocarbamate of zinc and dimethyl dithiocarbamate of zinc. The precipitate is separated from the mother liquor by filtering and dried in a current of air. Other metallic salts of these acids, such as those of iron, mercury and lead, are made in a similar manner.

The compounds thus produced are monomethyl dithiocarbamate,

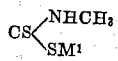

or dimethyl dithiocarbamates,

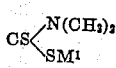

of the metal used, or a mixture of the two. We find that different metals produce salts which are suited to different rubber compounds, and also to different temperatures of vulcanization. The zinc salt, for instance, making an accelerator which will produce rapid acceleration at 225 degrees F., while the lead salt will not produce vulcanization at this abnormally low temperature but requires temperatures nearer the regular vulcanizing temperatures. The salts of other metals may be used with varying degrees of success, among which salts are those of manganese, molybdenum, antimony, tin, copper, iron, chromium, arsenic and mercury.

The mixture of monomethyl dithiocarbamate of zinc and dimethyl dithiocarbamate of zinc produced as described above can be used satisfactorily in the vulcanization process according to the following formula as an example:

100 parts by weight of smoked ceylon.
50  "    "    "    "   zinc oxide.
5   "    "    "    "   sulphur.
⅕   "    "    "    "   the accelerating compound.

At a temperature of 50 pounds steam pressure in a press a good cure will be obtained in about ten minutes. With the same compound at three pounds steam pressure a good cure will be obtained in a press in about 45 minutes.

As another specific example of the production of a metallic salt of alkylated dithiocarbamic acid other than zinc salt (which is preferred because of its white color), I have made iron salt of methylated dithiocarbamic acid. This salt was made by adding water solution of iron chloride to an oily liquid or water solution of a mixture of amino-ammonium salts of mono-methyl and dimethyl dithiocarbamic acids. The precipitate of iron salt thus formed is filtered and dried.

What I claim is:

1. Process for vulcanizing rubber consisting in treating it with sulphur and a metallic salt of a dithiocarbamic acid.

2. Process for vulcanizing rubber consisting in treating it with sulphur and a salt of a bivalent metal of a dithiocarbamic acid.

In testimony whereof, I have hereunto subscribed my name this 22nd day of March, 1921.

YASUJURO NIKAIDO.

Witnesses:
G. A. HUMREICH,
THOS. KLINK.